United States Patent [19]

Trebbi

[11] Patent Number: 4,819,380
[45] Date of Patent: Apr. 11, 1989

[54] VEHICLE DOOR WITH SLIDING WINDOW

[75] Inventor: Giorgio Trebbi, Turin, Italy

[73] Assignee: Fiat Auto S.p.A., Turin, Italy

[21] Appl. No.: 81,199

[22] Filed: Aug. 4, 1987

[51] Int. Cl.⁴ .............................................. B60T 1/16
[52] U.S. Cl. ...................................... 49/374; 49/437; 49/440
[58] Field of Search ................. 49/374, 376, 378, 437, 49/440

[56] References Cited

U.S. PATENT DOCUMENTS 3,703,053 11/1972 DeRees et al. .
4,219,968 9/1980 Sakai et al. .
4,561,211 12/1985 Raley et al. ............................ 49/374

FOREIGN PATENT DOCUMENTS 0158334 10/1985 European Pat. Off. ............ 296/146
2205147 9/1972 Fed. Rep. of Germany .
2840811 4/1980 Fed. Rep. of Germany .
2512752 1/1983 France .
2539680 3/1984 France .
23212 10/1910 United Kingdom .
165753 5/1922 United Kingdom .
466145 5/1937 United Kingdom .
2151680 7/1985 United Kingdom .

Primary Examiner—Kenneth J. Dorner
Assistant Examiner—Gerald A. Anderson
Attorney, Agent, or Firm—Sughrue, Mion, Zinn, Macpeak & Seas

[57] ABSTRACT

In a motor vehicle door of the so-called "open" type, the sliding window is constituted by a single unit having a runner cooperating with a fixed or telescopically-extendible guide rail which can extend from the upper edge of the body of the door.

The guide rail supports the window in an intermediate position between the two vertical end sides of the door.

7 Claims, 2 Drawing Sheets

VEHICLE DOOR WITH SLIDING WINDOW

The present invention relates to vehicle doors and in particular to a door including a body with two approximately vertical end sides and an approximately horizontal upper side, and a window having a respective upper edge slidable through the upper side of the body of the door between a lowered position and a raised position, in which the part of the door projecting above the upper side is constituted essentially by the window alone.

One is considering, in other words, so-called "open" doors currently used in sports-cars. In such doors, the arcuate structure which cooperates with the upper portion of the door space (ring) provided in the body and which receives the side edges and upper edge of the window when the window is closed are absent.

In so-called "open" doors with sliding windows there is a problem in the guiding of the sliding movement of the window securely between the lowered position and the raised position.

According to one solution currently used, the pane is divided into two parts, that is, an approximately triangular front part (deflector) which does not slide vertically relative to the body of the door, and a roughly rectangular rear part which slides vertically relative to the body of the door and to the front part which thus acts as a guide member. More precisely, the front part and the rear part of the window are coupled so as to be slidable relative to each other in a vertical sense along two respective facing vertical edges.

This solution is not very practical from a constructional point of view. The front part of the window has all the problems of an added element with its fixing members, weather strips, etc. Moreover, the presence of a fixed part and a movable part of the window makes the structure and manufacture of the weather strip which bounds the upper portion of the periphery of the door aperture more complex.

The object of the present invention is to provide a vehicle door of the type specified above in which the aforesaid disadvantages are eliminated.

In order to achieve this object, the present invention provides a vehicle door of the type specified above, characterised in that:

a device is provided for guiding the movement of the window, including a rail which can extend from the upper edge of the body of the door in a direction substantially parallel to the two end sides and in a position intermediate the two end sides themselves, and the sliding window is constituted by a single unit having at least one runner cooperating with the rail.

According to a preferred embodiment the, at least one runner is mounted at a certain distance from the upper edge of the window. Consequently, the rail which guides the movement of the window may also be formed so that it terminates at a certain distance from the position reached by the upper edge of the window in the fully raised position.

The invention thus allows considerable advantages to be obtained over the prior art solutions. Among these advantages may be mentioned:

the elimination of the fixed part of the window and its auxiliary members, such as fixing members, weather strips, etc., and the possibility of considerable structural simplification of the weather strip which bounds the upper portion of the edge of the door aperture; since the window is constituted by a single unit having a respective upper edge which is generally linear, it suffices for the weather strip to have a complementary linear shape, without the need to provide recesses and other profiled parts therein for cooperating with corresponding shaped parts of the window.

In a particularly advantageous embodiment, the window has a general curvature of predetermined radius in the in the direction of movement between the lowered position, and the rail also has a generally similar curvature (that is, with its concavity facing in the same direction) of a radius less than the predetermined radius, in an arrangement whereby, at least adjacent the raised position, the window is urged towards the centres of curvature (of the window and the rail). Thus, the window, at least in the final part of its raising movement, is urged inwardly of the passenger compartment of the vehicle to promote its proper adherence to the weather strip which bounds the periphery of the door aperture.

The invention will now be described, purely by way of non-limiting example, with reference to the appended drawings, in which.

Figure 1:
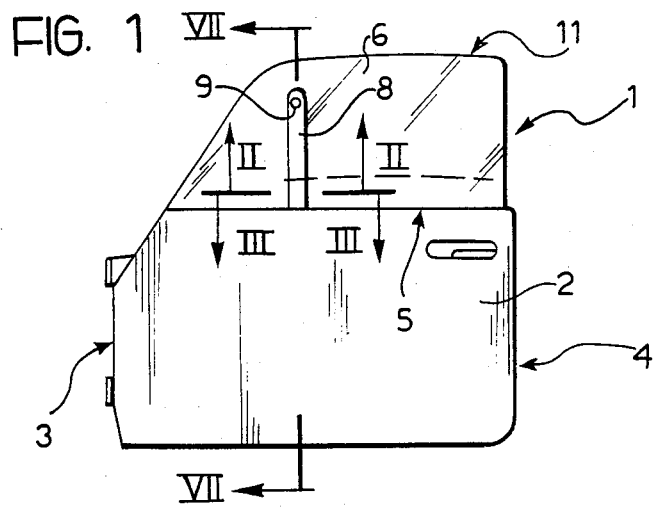
FIG. 1 is a side elevational view of a vehicle door according to the invention.

In the drawings a motor vehicle door, such as, for example, the front left-hand door of a car, is generally indicated 1.

Figure 6:
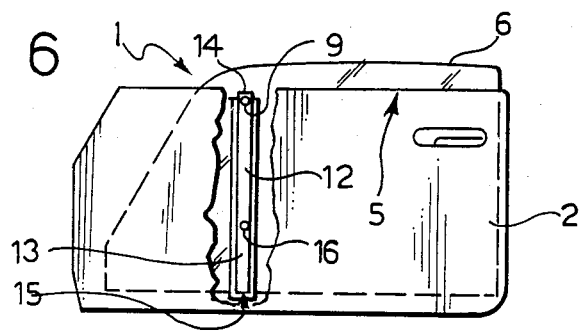

One is concerned particularly with a door of the so-called "open" type frequently provided in sport-scars. The door 1 can be seen to comprise essentially:

a body 2 for hinging to the fixed part (not illustrated) of the vehicle body and having two end sides, a front side 3 and a rear side 4 respectively, which extend approximately vertically and an upper side 5 which extends approximately horizontally, and a window 6 slidable through the upper edge 5 between a raised position (illustrated in full outline in FIGS. 1 and 4) and a lowered position (illustrated in broken outline in FIG. 1 and in full outline in FIG. 6).

The term "open" is intended to indicate the fact that the door 1 differs from most doors currently used in motor vehicles in that it does not have an arcuate structure (arch) projecting upwardly from the end edges 2, 4 of the body 2 and defining, together with the upper edge 5, the space outside the body 2 in which the window 6 moves. In other words, in the door according to the invention, the part projecting above the upper side 5 is constituted essentially by the window 6 alone.

One salient characteristic of the door according to the invention is the fact that the window 6 is constituted by a single unit, that is to say, by a single piece of glass or, at most, different parts connected together so as to constitute a single body. In other words, there is not, as in some prior art solutions, one part of the window which is movable vertically relative to the body of the door and one part which is not movable.

Figure 2:
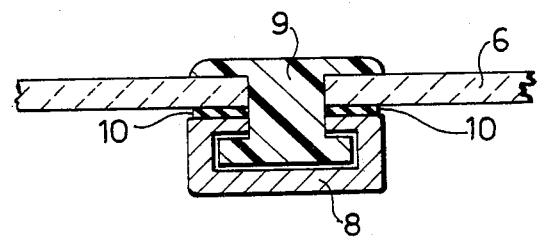
FIG. 2 is a section taken on the line II—II of FIG. 1, on an enlarged scale.

In FIGS. 1 and 2, a guide structure (rail), indicated 8, is provided to support the window 6 and guide it during its sliding movement between its lowered and raised positions. This movement is driven by a window raising device of known type, not illustrated in the drawings.

The guide structure or rail 8 is mounted on the body 5 so as to be approximately in line with the inner surface of the window 6, that is, the surface of the window which, in the normal position of use, faces inwardly of the passenger compartment.

The rail 8 is also mounted in a position intermediate the vertical end edges 3 and 4 of the door. In other words, the rail 8 acts on the window 6, guiding its movement, in an approximately barycentric position relative to the window 6 itself.

In the embodiment of FIG. 2, the rail 8 is constituted essentially by a C-profiled element which is fixed at its lower end to the body 2 of the door 1 and opens towards the window 6. The rail 8 defines within it a longitudinal sliding seat for a runner 9 constituted by a sort of button inserted in a corresponding aperture provided in the window 6. Seals 10 of low-friction material, for example flocked strips, are applied to the face of the rail 8 facing the window 6 so as to facilitate the sliding of the window and avoid accidental scoring of the inner surface of the window 6.

As a result of the movement of the window 6 between the raised position and the lowered position, the runner or button 9 slides within the profiled element 8 which thus guides the movement of the window, preventing it from pivoting relative to the body 2 and breaking.

More particularly, as best seen in the side elevational view of FIG. 1, the button 9 is mounted at a certain distance from the upper edge (indicated 11) of the window. Consequently, the length of the profiled element 8 constituting the guide rail for the window (its length in the direction of movement of the window 6) may be chosen to be smaller than the height of the part of the window 6 which projects above the edge 5 of the body 2 when the window 6 itself is in its fully raised position.

Thus, the upper part of the window 6, that is, the part adjacent the edge 11 (when the window 6 is in its fully raised position), is entirely free so as to permit observation from the motor vehicle. The solid angle of view of the driver and the passengers is thus increased.

In the embodiment referred to in FIG. 2, the profiled element (rail) 8 is mounted in a fixed position relative to the body 2.

Consequently, when the window 6 is lowered to the position illustrated in broken outline in FIG. 1, the profiled element 8 continues to project upwardly from the upper edge 5 of the body 2 of the vehicle.

The variant of the invention referred to in FIGS. 3 to 6 relates to a solution in which the rail which guides the window 6 is, so to speak, retractable within the body of the door 2 and is thus able to follow the lowering and raising movements of the window 6 itself.

In this embodiment, the rail (here indicated 12) in which the runner or button 9 moves is itself slidable on a further guide or rail 13 mounted in a fixed position within the body 2.

For example, the movable rail 12 and the fixed guide rail 13 in which it slides may be coupled together telescopically.

The rail 12 has a length (in the direction of sliding of the window 6) about equal to the distance between the runner or button 9 and the upper edge 5 of the body of the door 2 in the fully raised position of the window 6, increased by a height or foot (indicated h in FIG. 4) corresponding effectively to the minimum height necessary for a coupling between the rail 12 and the fixed guide 13 such as to be able to support the window 6 laterally, resisting pivoting forces resulting from the static and dynamic forces which act on the window 6 during use.

The fixed guide 13 has an overall length about equal to the length of the rail 12 which slides within it.

In the embodiment referred to in FIGS. 3 to 6, the rail 12 has end walls, an upper one 14 and a lower one 15, for forming respective abutment surfaces for the runner or button 9 and for a further runner or button 16 also fixed to the window 6 in correspondence with its lower edge projecting into the body 2. In practice, the runner 16 may be made in the form of a sort of bracket which supports the window 6 adjacent its lower edge.

In each case, the position of assembly of the runner 9 and 16 and the overall length of the rail 12 (that is, the distance between the end walls 14 and 15) is selected so that the distance between the runners 9 and 16 is less than the distance between the end walls 14 and 15.

When the window 6 is in its fully raised position (FIG. 4), the runner or button 9 which is in the upper position bears against the upper end wall 14 of the rail 12, keeping it in the position of maximum upward extension from the fixed part 13 mounted in the body 2 of the door.

When the window 6 is lowered (FIG. 5), the runners 9 and 16 are also lowered and carry with them the rail 12 which is thus returned downwardly, that is, into the fixed guide 13 and the body of the door 2. More particularly, even when the sliding of the rail 12 under gravity relative to the fixed guide 13 is hindered by friction the lower runner 16, which is brought to bear against the lower end wall 5 of the rail 12, is able to ensure the downward movement of the rail 12.

When the window 6 has been fully lowered (FIG. 6), the rail 12 is completely or almost completely housed within the body of the door 2 so as to eliminate the disagreeable effect which could result from the presence of a rail standing proud of the upper edge 5 of the body of the door 4 when the window 6 is completely lowered.

Figure 4:
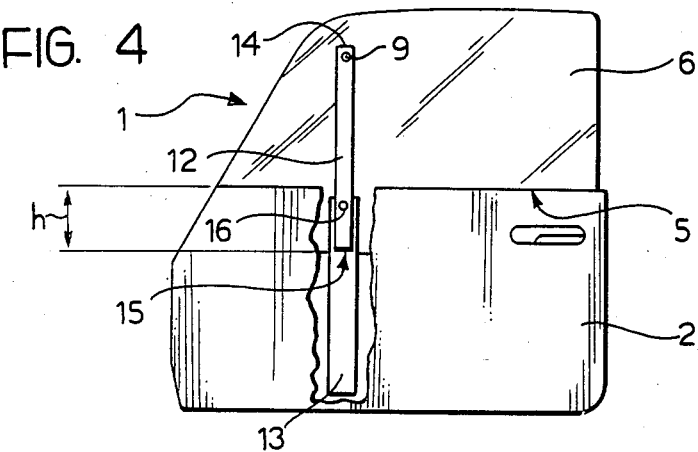
FIGS. 4 to 6 illustrate schematically three different operating positions of a motor vehicle door in accordance with the variant of FIG. 3.
Figure 5:
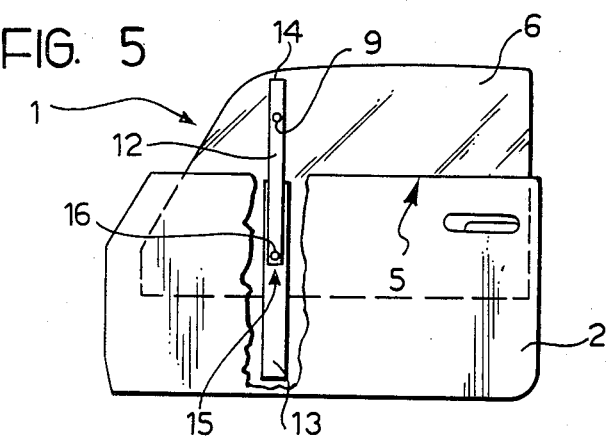

During the raising of the window 6, which is carried out in the opposite sequence from that illustrated in FIGS. 4 to 6, the rail 12 follows the raising movement of the window 6 until it is brought into its position of maximum extension from the body of the door 2, illustrated in FIG. 4.

In particular, the structure described, in which the runners 9 and 6 are able to slide relative to the rail 12 which itself slides relative to the fixed guide 13, permits the overall vertical bulk of the device for guiding the window (the rail 12 and fixed guide 13) to be reduced enabling the door to be made with a very favourable ratio between the glass or open surface and the surface of the body 2.

Figure 7:
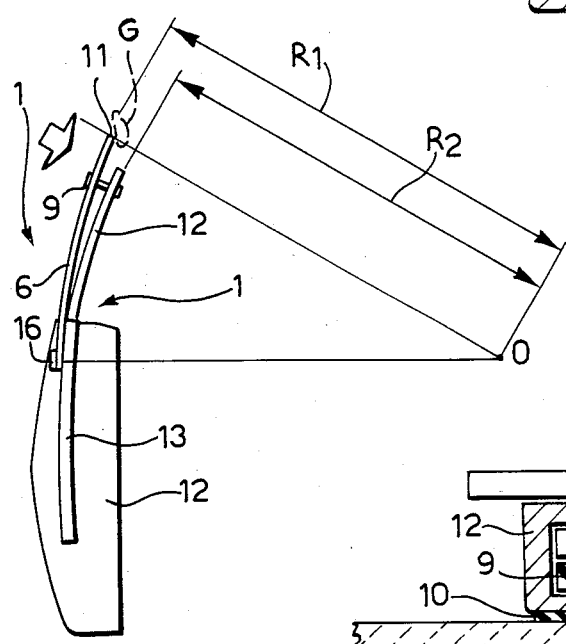
FIGS. 7 is a section taken on the line VII—VII of FIG. 1 and relating in an identical manner to both the embodiments of FIGS. 2 and 3.
Figure 3:
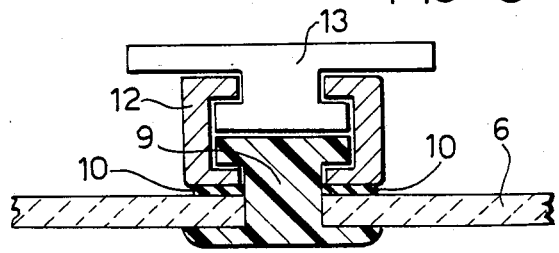
FIG. 3 is another sectional view opposite the view of FIG. 2, but relating to a variant of the invention.

The sectional view of FIG. 7 relates, by way of example, to the variant of FIGS. 3 to 6. The principle illustrated therein, however, applies in an identical manner to the embodiment of FIG. 2.

In particular, in the drawing the window 6 is illustrated in cross-section relative to the door 1 and may have a generally curved shape.

Therefore, the corresponding guide device (the rail 12 and fixed guide 13 or the profiled element 8 in the embodiment of FIG. 2) must also have a curved shape of similar curvature.

The description of the curvatures of the window 6 and its guide device as similar is intended to express the fact that both the window 6 and its guide device have curvatures with centres of curvature located on the same side of the door 1.

In the example illustrated here, reference is made to a theoretical situation in which the window 6 and the guide device (more specifically the rail 12) have respective curved profiles of circular development with a single centre of curvature, indicated 0.

One is dealing with a purely schematic representation since, in general, the curved profiles are not exactly circular and do not have a common centre of curvature.

This consideration of a representation, however, enables another salient aspect of the invention to be explained, namely, that in which, it being allowed that the window 6 has a generally curved profile with a radius of curvature equal to $R_1$, the profile of curvature of the guide device (rail 12) is selected so as to have an overall radius of curvature $R_2$ less than $R_1$.

In other words, the guide device 12 projects inwardly of the door 1 relative to the window 6, that is, towards the interior of the passenger compartment, by an extent which increases gradually towards the top of the door.

As a result of this conformation of the guide device, during the raising and particularly during the final part of this raising movement, the window 6 is forced inwardly of the passenger compartment, as shown schematically by the arrow in the upper part of FIG. 7.

This forced movement into the passenger compartment is intended to facilitate complete adhesion of the upper edge 11 of the window to the weather strip, illustrated schematically in broken outline and indicated G, bounding the upper edge of the door aperture provided in the vehicle body.

I claim:

1. A vehicle door comprising a body having two approximately vertical end sides and an approximately horizontal upper side, and a window having a respective upper edge slidable through an upper side of the body of the door between a lowered position and a raised position, in which a part of the door projecting above the upper side is constituted essentially of the window alone, wherein a device is provided for guiding the movement of the window, said device including a rail which can extend from the upper edge of the body of the door in a direction substantially parallel to the two end sides and positioned intermediate the two end sides, the sliding window is constituted by a single unit having at least one runner slidingly cooperating with the rail, and a fixed part is mounted in the body of the door and slidingly coupled to the rail whereby the rail can slide relative to the fixed part to follow the window in its movement between the lowered position and the raised position.

2. A door according to claim 1, wherein said at least one runner is mounted at a certain distance from the respective upper edge of the window.

3. A door according to claim 1 wherein the window has a general curvature of a predetermined radius in the direction of movement between the lowered position and the raised position, and the rail also has a generally similar curvature of a radius less than the predetermined radius, whereby, at least adjacent the raised position, the window is urged towards said rail.

4. A door according to claim 1 wherein said at least one runner is coupled to the rail so as to be slidable in the direction of the rail itself.

5. A device according to claim 1, wherein the rail has upper and lower end walls separated by predetermined distance, and in that the window has a further runner coupled to the rail so as to be slidable in the direction of the rail itself, the at least one runner and the further runner being fixed to the window at a distance less than the predetermined distance whereby the at least one runner and the further runner can slide relative to the rail until they reach respective positions in which they bear against the upper end wall and the lower end wall of the rail.

6. A door according to claim 5, wherein the fixed part and the rail are of about the same length.

7. A door according to claim 5 wherein said further runner, is mounted so as to be a lower support for the window.

* * * * *